(12) United States Patent  
Dejarme et al.

(10) Patent No.: US 11,780,753 B2  
(45) Date of Patent: Oct. 10, 2023

(54) DESTRUCTION OF PFAS VIA AN OXIDATION PROCESS AND APPARATUS SUITABLE FOR TRANSPORTATION TO CONTAMINATED SITES

(71) Applicant: Revive Environmental Technology, LLC, Columbus, OH (US)

(72) Inventors: Lindy E. Dejarme, Columbus, OH (US); Kavitha Dasu, Powell, OH (US); Russel R. Sirabian, Columbus, OH (US); Jeffrey Ellis, Columbus, OH (US); Dan Garbark, Columbus, OH (US); Nathan Bryant, Columbus, OH (US); John Tallarico, Columbus, OH (US); Joseph Casciano, Columbus, OH (US); Slawomir Winecki, Columbus, OH (US); David Holley, Columbus, OH (US); Joshua James, Columbus, OH (US); Keith Brown, Solon, OH (US); Doug Hendry, Columbus, PA (US); Darwin Argumedo, Columbus, OH (US); Aaron Frank, Dublin, OH (US); Christopher Gordon Scheitlin, Columbus, OH (US); Michael M. Miller, Worthington, OH (US); Matthew Vaughan, Columbus, OH (US)

(73) Assignee: REVIVE ENVIRONMENTAL TECHNOLOGY, LLC, Columbus, OH (US)

( * ) Notice: Subject to any disclaimer, the term of this patent is extended or adjusted under 35 U.S.C. 154(b) by 0 days.

(21) Appl. No.: 17/871,907

(22) Filed: Jul. 23, 2022

(65) Prior Publication Data  
US 2023/0049247 A1 Feb. 16, 2023

Related U.S. Application Data

(63) Continuation of application No. 16/916,085, filed on Jun. 29, 2020, now Pat. No. 11,401,180.  
(Continued)

(51) Int. Cl.  
*C02F 1/44* (2023.01)  
*C02F 1/04* (2023.01)  
(Continued)

(52) U.S. Cl.  
CPC ............... *C02F 1/441* (2013.01); *B01J 4/002* (2013.01); *C02F 1/04* (2013.01); *C02F 1/722* (2013.01);  
(Continued)

(58) Field of Classification Search  
CPC .. C02F 1/441; C02F 1/04; C02F 1/722; C02F 2101/36; C02F 2201/002; C02F 1/02;  
(Continued)

(56) References Cited

U.S. PATENT DOCUMENTS 4,338,199 A * 7/1982 Modell ..................... C02F 1/16  
210/721  
4,543,190 A * 9/1985 Modell ..................... C02F 1/16  
210/721  
(Continued)

FOREIGN PATENT DOCUMENTS

CN 101987749 B 2/2012  
CN 102190363 B 11/2012  
(Continued)

OTHER PUBLICATIONS

Suzuki et al, English Translation of Patent Publication JPH11226584A, Aug. 1999. (Year: 1999).*  
(Continued)

*Primary Examiner* — Joseph W Drodge

(57) ABSTRACT

Per- and polyfluoroalkyl substances (PFAS) are destroyed by oxidation in supercritical conditions. PFAS in water can  
(Continued)

be concentrated and prepared for destruction in a pretreatment phase. Following annihilation of the PFAS in supercritical conditions to levels below 5 parts per trillion (ppt), the water effluent can be used to recover heat, returned to sub-critical conditions, and then released back into the environment.

22 Claims, 7 Drawing Sheets

Related U.S. Application Data

(60) Provisional application No. 62/948,765, filed on Dec. 16, 2019, provisional application No. 62/868,858, filed on Jun. 28, 2019.

(51) Int. Cl.
  *C02F 1/72* (2023.01)
  *B01J 4/00* (2006.01)
  *C02F 101/36* (2006.01)

(52) U.S. Cl.
  CPC .... *C02F 2101/36* (2013.01); *C02F 2201/002* (2013.01)

(58) Field of Classification Search
  CPC .... C02F 1/44; C02F 1/583; C02F 1/72; C02F 1/725; C02F 2101/363; C02F 2201/008; C02F 2301/04; C02F 2301/066; C02F 2301/10; B01J 3/00; B01J 3/008; B01J 3/02; B01J 4/002; B01J 19/00; B01J 19/26; B01J 2219/00601; B01J 2219/00074; B01J 2219/00105; B01J 2219/0011; B01J 2219/00121; B01J 2219/00123; B01D 61/04; B01D 61/10; B01D 2311/2634
  See application file for complete search history.

(56) References Cited

U.S. PATENT DOCUMENTS

| | | | |
|---|---|---|---|
| 4,861,497 A | 8/1989 | Welch et al. | |
| 4,898,107 A | 2/1990 | Dickinson | |
| 5,232,604 A * | 8/1993 | Swallow | C02F 1/72 |
| | | | 210/779 |
| 5,437,798 A | 8/1995 | LaRoche et al. | |
| 5,492,634 A | 2/1996 | Hong et al. | |
| 5,565,616 A | 10/1996 | Li et al. | |
| 5,688,399 A | 11/1997 | Halff et al. | |
| 5,698,750 A * | 12/1997 | Mouk | C09K 5/044 |
| | | | 570/177 |
| 5,709,800 A | 1/1998 | Ross et al. | |
| 5,746,926 A | 5/1998 | Ross et al. | |
| 5,785,868 A | 7/1998 | Li et al. | |
| 5,837,149 A | 11/1998 | Ross et al. | |
| 6,010,632 A | 1/2000 | Ross et al. | |
| 6,017,460 A | 1/2000 | Eller et al. | |
| 6,030,587 A | 2/2000 | Haroldsen et al. | |
| 6,118,039 A | 9/2000 | Shah | |
| 6,129,991 A | 10/2000 | Warnes et al. | |
| 6,288,289 B1 * | 9/2001 | Boyd | C02F 1/72 |
| | | | 568/934 |
| 6,303,844 B1 | 10/2001 | Morita et al. | |
| 6,475,396 B1 | 11/2002 | Wofford, III et al. | |
| 6,958,122 B1 | 10/2005 | Gidner et al. | |
| 7,186,345 B2 | 3/2007 | Lee et al. | |
| 7,399,408 B2 | 7/2008 | Joussot-Dubien et al. | |
| 7,495,145 B1 * | 2/2009 | Doyle, III | A62D 3/38 |
| | | | 422/165 |
| 7,708,897 B2 | 5/2010 | Joussot-Dubien et al. | |
| 7,811,537 B2 | 10/2010 | Garcia-Ortiz et al. | |
| 7,812,211 B2 | 10/2010 | Al Nashef et al. | |
| 8,361,175 B2 | 1/2013 | Goldacker et al. | |
| 9,029,623 B2 | 5/2015 | Chen et al. | |
| 9,328,008 B2 | 5/2016 | Wang et al. | |
| 10,040,708 B2 | 8/2018 | Dickson | |
| 10,086,346 B2 | 10/2018 | Brucato et al. | |
| 10,143,995 B2 | 12/2018 | Kamler | |
| 10,287,185 B2 | 5/2019 | Nickelsen et al. | |
| 10,307,720 B2 | 6/2019 | Wang et al. | |
| 10,370,276 B2 | 8/2019 | Wang et al. | |
| 10,675,664 B2 | 6/2020 | Oberle et al. | |
| 10,688,464 B2 | 6/2020 | Hong et al. | |
| 10,752,521 B2 | 8/2020 | Nelson | |
| 10,851,006 B2 | 12/2020 | Cai | |
| 10,858,270 B2 | 12/2020 | Shah | |
| 10,913,668 B2 | 2/2021 | Nickelsen et al. | |
| 11,015,136 B2 | 5/2021 | Dibble | |
| 11,027,988 B2 | 6/2021 | Nickelsen et al. | |
| 11,401,180 B2 * | 8/2022 | Dejarme | C02F 1/04 |
| 11,407,666 B2 * | 8/2022 | Rosansky | C04B 35/12 |
| 2002/0070179 A1 | 6/2002 | Pilz et al. | |
| 2002/0113024 A1 | 8/2002 | Pilz et al. | |
| 2003/0146310 A1 | 8/2003 | Jackson | |
| 2004/0020616 A1 | 2/2004 | Dahlblom et al. | |
| 2004/0232088 A1 | 11/2004 | Stenmark et al. | |
| 2005/0006317 A1 * | 1/2005 | Lee | C02F 1/727 |
| | | | 210/205 |
| 2007/0140935 A1 | 6/2007 | Hazlebeck | |
| 2011/0127778 A1 | 6/2011 | Kinney | |
| 2013/0126442 A1 | 5/2013 | Bakas et al. | |
| 2015/0060371 A1 | 3/2015 | Al-Duri | |
| 2017/0348743 A1 | 12/2017 | Kerfoot | |
| 2018/0354834 A1 | 12/2018 | Essing et al. | |
| 2020/0010349 A1 | 1/2020 | Stroud et al. | |
| 2020/0155885 A1 | 5/2020 | Strathmann et al. | |
| 2020/0277213 A1 | 9/2020 | Nagar et al. | |

FOREIGN PATENT DOCUMENTS

| | | | | |
|---|---|---|---|---|
| CN | 102491485 B | * | 10/2013 | ............... H05H 1/24 |
| CN | 102642909 B | | 12/2013 | |
| CN | 204939232 U | * | 1/2016 | ............. C02F 11/06 |
| CN | 20532782 U | * | 6/2016 | ................ C02F 9/10 |
| CN | 104445573 B | | 6/2016 | |
| EP | 708058 A2 | * | 9/1995 | ............. C02F 11/08 |
| EP | 0535320 B1 | | 4/1996 | |
| JP | H11226584 A | * | 8/1999 | ................ B01J 3/04 |
| JP | 3346773 B2 | * | 11/2002 | ................ B01J 3/00 |
| JP | 2010131478 A | * | 6/2010 | ............. C02F 1/72 |
| JP | 2010131478 A | | 6/2010 | |
| WO | 2006004503 A1 | | 1/2006 | |
| WO | 2008057924 A1 | | 5/2008 | |
| WO | 2012177907 A1 | | 12/2012 | |
| WO | 2013159532 A1 | | 10/2013 | |
| WO | 2016086741 A1 | | 6/2016 | |
| WO | 2019040277 A1 | | 2/2019 | |
| WO | 2020125900 A9 | | 11/2020 | |

OTHER PUBLICATIONS

Zab, English Translation of Patent Publication JP3346773B2, Nov. 2002. (Year: 2002).*

Nakamori et al, English Translation of Patent Publication JP2010131478A, Jun. 2010. (Year: 2010).*

Zhang etal, English translation of Patent Publication CN102491485B, Oct. 2013. (Year: 2013).*

Zhao et al, English translation of Patent Publication CN204939232U, Jan. 2016. (Year: 2016).*

Gao et al, English translation of Patent Publication CN205328782U, Jun. 2016. (Year: 2016).*

Deshusses, Marc, "Supercritical Water Oxidation (SCWO) for Complete PFAS Destruction_" Accessed Dec. 2022 https://www.serdp-estcp.org/Program-AreasIEnvironmental-RestorationIER20-5350.

Miller et al, "Supercritical Water Oxidation of a Model Fecal Sludge Without the Use of a Co-Fuel," Chemosphere 41:189-196 (2015).

(56) References Cited

OTHER PUBLICATIONS

Vadillo et al, "Supercritical Water Oxidation," Advanced Oxidation Processes for Wastewater Treatment: Emerging Green Chemical Technology, 333-353 (2018).
Meng et al, "Efficient Removal of Perfluorooctane Sulfonate From Aqueous Film-Forming Foam Solution by Aeration-Foam Collection," Chemosphere (2018).
Mitchell et al, "Degradation of Perfluorooctanoic Acid by Reactive Species Generated through Catalyzed H202 Propagation Reactions," Environ. Sci. Technol. Lett. 1:117-121 (2014).
Bentel et al, "Defluorination of Per- and Polyfluoroalkyl Substances (PFASs) with Hydrated Electrons: Structural Dependence and Implications to PFAS Remediation and Management," Environ. Sci. Technol. 53:7 (2019).
Wang et al, "Influence of Calcium Hydroxide on the Fate of Perfluorooctanesulfonate Under Thermal Conditions," Journ. Hazardous Mat. 192 (2011).
Dickenson et al, "Treatment Mitigation Strategies for Poly- and Perfluoroalkyl Substances," Web Report #4322, Water Research Foundation (2016).
Patterson et al, "Effectiveness of Point-of-Use/Point-of-Entry Systems to Remove Per- and Polyfluoroalkyl substances from Drinking Water," AWWA Wat Sci. e1131 (2019).
Nzeribe et al, "Physico-Chemical Processes for the Treatment of Per- and Polyfluoroalkyl Substances (PFAS): A Review," Critical Reviews in Environmental Science and Technology, 49:10 (2019).
Ross et al, "A Review of Emerging Technologies for Remediation of PFAs," Remediation 28:101-126 (2018).
Wu et al, "Rapid Destruction and Defluorination of Perfluorooctanesulfonate by Alkaline Hydrothermal Reaction," Environ. Sci. Technol. Lett. 6:10 (2019).
Geocycle Cement Australia, "AFFF and PFAS," Accessed Dec. 2022 https://www.cementaustralia.com.au/geocycle.
"About Supercritical Water Oxidation or SCWO," Sanitation Solutions at Duke University Community Treatment Project, Accessed Dec. 2022, https://sanitation.pratt.duke.edu/community-treatment/about-community-treatment-project.
Duke Startup Converts Fecal Sludge to Clean Reusable Water, Oct. 26, 2018_ Accessed Dec. 2022. https://pratt.duke.edu/about/news/duke-startup-converts-fecal-sludge-clean-reusable-water.
Merino et al, "Degradation and Removal Methods for Perfluoroalkyl and Polyfluoroalkyl Substances in Water," Environmental Engineering Science 33:9 (2016).
Cilliers, J. J., "Hydrocyclones for Particle Size Separation", Particle Size Separation, 2000, pp. 1819-1825 Academic Press.
Marrone P. A. et al., "Salt precipitation and scale control in supercritical water oxidation—part B: commercial/full-scale applications", J. of Supercritical Fluids 29 (2004) 289-312.
Li et al, "Supercritical Water Oxidation for Environmentally Friendly Treatment of Organic Wastes", Advanced Supercritical Fluids Technologies, 2019, Igor Pioro, IntechOpen, https://www.intechopen.com/chapters/69550 DOI: 10.5772/intechopen.89591.
Da Silva-Rackov et al, "Degradation of PFOA by Hydrogen Peroxide and Persulfate Activated by Iron-Modified Diatomite," Applied Catalysis B: Environmental 192:253-259 (2016).
Machine translation of Chinese Patent No. CN 102190363 B.
Machine translation of Chinese Patent No. CN 101987749 B.
Machine translation of European Patent No. EP 0535320 B1.
Machine translation of WO 2013159532 A1.
Machine translation of WO 2016086741 A1.
Machine translation of Japanese Patent Application JP 2010131478A.
International Search Report and Written Opinion from International Application No. PCT/US2020/040196 dated Sep. 28, 2020.
International Preliminary Report on Patentability from International Application No. PCT/US2020/040196 dated Dec. 28, 2021.
Machine translation of Chinese Patent No. CN 104445573 B.
Machine translation of Chinese Patent No. CN 102642909 B.

* cited by examiner

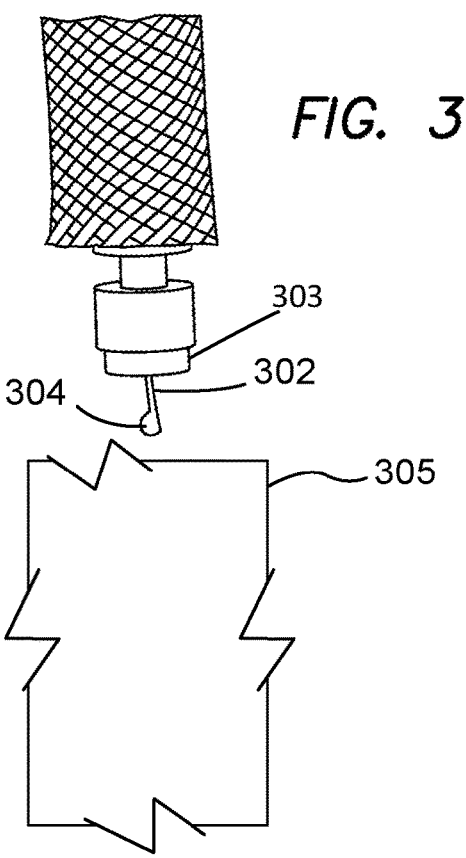
FIG. 3
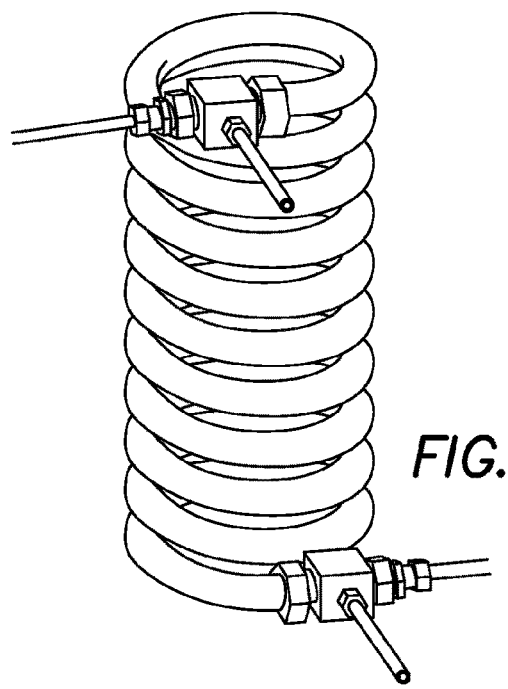
FIG. 4A
FIG. 4B
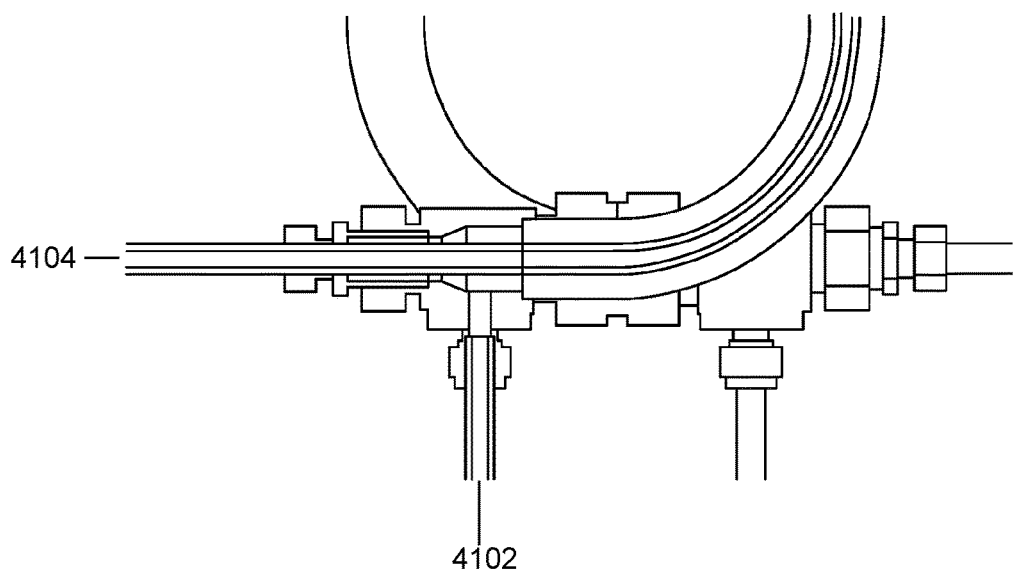

DESTRUCTION OF PFAS VIA AN OXIDATION PROCESS AND APPARATUS SUITABLE FOR TRANSPORTATION TO CONTAMINATED SITES

RELATED APPLICATIONS

This application is a continuation of U.S. patent application Ser. No. 16/916,085, filed 29 Jun. 2020, now U.S. Pat. No. 11,401,180, and claims the priority benefit of US Provisional Patent Application Ser. Nos. 62/948,765, filed 16 Dec. 2019, and 62/868,858, filed 28 Jun. 2019.

INTRODUCTION

Per- and polyfluoroalkyl substances (PFAS), including perfluorooctane sulfonate (PFOS) and perfluorooctanoic acid (PFOA), and hundreds of other similar compounds, have been widely used in the United States in a multitude of applications. There are significant concerns associated with these compounds due to widespread contamination coupled with uncertainties about risks to human health and the environment. PFAS are molecules having chains of carbon atoms surrounded by fluorine atoms. The C—F bond is very stable enabling the compounds to persist in the natural environment. Some PFAS include hydrogen, oxygen, sulfur, phosphorus, and/or nitrogen atoms. One example is PFOS:

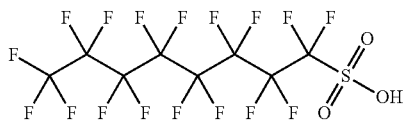

Although some PFAS compounds with known human health risks have been voluntarily phased out (PFOA and PFOS), legacy contamination remains. Replacement PFAS compounds have been introduced with limited understanding of their health risks. Currently, only PFOA and PFOS are addressed in Lifetime Health Advisories at the Federal level, with no established maximum contaminant level (MCL) to regulate the acceptable level of these and other PFAS compounds in drinking water. PFAS contamination in drinking water sources in 1,582 locations in 49 states as of May 2020. Currently used techniques for treating PFAS-contaminated water are expensive, and management of spent media is costly and may result in long-term liability.

Numerous methods have been developed for remediating PFAS in the environment. For example, Oberle et al. in US 2019/0314876 describes a method and system for remediating soil containing PFAS in which the soil is heated and the PFAS volatilized, captured and condensed, steam added, and then the concentrated PFAS solution subjected to electro oxidation.

In this invention, PFAS is destroyed by oxidation in supercritical water (SCWO). In addition to our work, Deshusses at Duke University has reported some early findings and a U.S. Department of Defense award issued in May 2020 entitled "Supercritical Water Oxidation (SCWO) for Complete PFAS Destruction."

Application of SCWO to PFAS is relatively new and presents new challenges. SCWO of organic compounds has long been known and is described in numerous papers and patents. For example, Welch et al. in U.S. Pat. No. 4,861,497 described the use of a liquid phase oxidant such as hydrogen peroxide or ozone in supercritical water for the destruction of organic compounds; testing with destruction of propylene glycol at 750 to 860° F. at 5000 psia (pounds per square inch atmospheric) resulted in about 98% destruction. Swallow et al. in U.S. Pat. No. 5,232,604 described SCWO of organic compounds with an oxidant such as hydrogen peroxide and a reaction rate enhancer such as nitric oxide; in one example, sodium hydroxide and sodium nitrate were used to neutralize hydrochloric acid formed in the oxidation of methylene chloride. Aquarden Technologies in US Published Patent Application No. 2019/0185361 notes that in the SCWO process precipitation occurs in a zone where the fluid goes from sub-critical to supercritical and designed a reactor with a residue outlet connection near this zone. Miller et al. in "Supercritical water oxidation of a model fecal sludge with the use of a co-fuel" Chemosphere 141 (2015) 189-196 reported on the SCWO reaction of a feces simulant in the presence of 48% excess oxygen. The use of auxiliary fuels can be used to generate hydrothermal flames in SCWO reactors that are characterized by high temperatures, typically above 1000° C. See "Supercritical Water Oxidation," in Advanced Oxidation Processes for Wastewater Treatment," (2018), 333-353.

Despite extensive prior efforts to develop systems for destroying PFAS, there remains a need for efficient systems for treating PFAS compositions and the complete destruction of PFAS.

SUMMARY OF THE INVENTION

Initially, water or soil samples may be treated to concentrate PFAS in a substantially-reduced volume. In some instances, the PFAS-containing media has been stored in a concentrated form and does not require additional treatment to concentrate it. The concentrated PFAS mixtures can be put in containers and shipped to a centralized site for PFAS destruction. Alternatively, in some preferred embodiments, the concentrated PFAS mixtures are treated on-site where they originate. The concentrated PFAS solution is destroyed by oxidation. Suitable oxidation processes are described below. Most preferably, the oxidation process comprises Supercritical Water Oxidation (SCWO), which we have found can rapidly result in over 100,000 times reduction in PFAS concentration, for example, a reduction in PFOA from 1700 parts per million (ppm) to 5 parts per trillion (ppt) by weight or less. To enable efficient destruction with little or no external heat supply during steady state operation, fuels may be added (or, in some occurrences, PFAS may be present with sufficient organic materials that serve as the fuel) to supply some or all of the heat needed to power the oxidation. The resulting effluent can then be confirmed to contain little or no PFAS, typically 5 ppt or less, and then be released back into the environment as safe, clean water.

In one aspect, the invention provides a method of destroying PFAS in a PFAS-containing aqueous mixture, comprising: reacting PFAS with an aqueous oxidant, and further comprising reaction with an alkali or alkaline earth element, to convert the PFAS to a product mixture comprising carbon dioxide and an alkali or alkaline earth fluoride. The most preferred oxidant is hydrogen peroxide.

In another aspect, the invention provides a method of (or system for) destroying PFAS in a PFAS-containing aqueous mixture comprising pretreating a PFAS-containing aqueous solution to separate PFAS from salts such as sodium chloride. A PFAS-containing aqueous solution is subjected to one or preferably a cascade of plural stages of reverse osmosis to form a brine and a desalted solution. The resulting desalted aqueous fraction from the reverse osmosis can be subjected to SCWO. The resulting brine, optionally treated with acid, is then heated to a sufficient temperature (preferably at least 150° C. or at least 200° C. or 250° C. or up to 300° C. or up to 350° C.) to volatilize any remaining PFAS compounds remaining in the brine; preferably resulting in brine having 5 ppt PFAS or less. The volatilized PFAS components are then condensed and captured, and optionally recombined with all or a portion of the desalted solution prior to SCWO. Alternatively, the condensed PFAS can be subjected to SCWO without recombining with the desalted solution. As with any of the aspects described herein, this pretreatment method may be used by itself or in combination with any of the other aspects or other techniques described herein.

In a further aspect, the invention provides a method of destroying PFAS in a PFAS-containing aqueous mixture, comprising: subjecting the PFAS-containing aqueous mixture to a separation procedure and separating the PFAS-containing aqueous mixture into a PFAS-enriched fraction and a PFAS-depleted fraction; heating at least a portion of the PFAS-depleted fraction to a temperature of at least 300° C. to form a heated PFAS-depleted fraction; prior to a supercritical destruction phase, combining the heated PFAS-depleted fraction with a lower temperature PFAS-depleted fraction to form a hot PFAS-containing aqueous mixture; and reacting the hot PFAS-containing aqueous mixture with an oxidant under supercritical conditions. As an alternative, the PFAS-containing aqueous mixture is separated into a salt-enriched fraction and a salt-depleted fraction (this is the typical separation for reverse osmosis), heating the salt-depleted fraction to a temperature of at least 300° C. to form a heated salt-depleted fraction; prior to a supercritical destruction phase, combining the heated salt-depleted fraction with a lower temperature salt-depleted fraction to form a hot PFAS-containing aqueous mixture; and reacting the hot PFAS-containing aqueous mixture with an oxidant under supercritical conditions.

Any of the inventive aspects may be further defined by one or any combination of the following: wherein the step of reacting PFAS with an aqueous oxidant occurs under supercritical conditions; wherein the method is carried out in a mobile trailer; wherein the method comprises: passing PFAS-contaminated water into a tank, wherein the water is super-saturated with air; wherein pressure in the tank is relatively low such that bubbles are generated in the water and create a foamed mixture; and collecting the foamed mixture; wherein prior to reacting PFAS with an aqueous oxidant, the PFAS-containing aqueous mixture comprises at least 100 ppm PFOA and the method decreases the PFOA concentration by at least $10^6$ or $10^7$ or $10^8$; wherein the PFAS is reacted with oxidant in an oxidation reactor and after leaving the reactor the effluent is treated with a solution comprising NaOH, LiOH, or KOH to produce a neutralized solution that is recycled to neutralize additional effluent; wherein the neutralized effluent is at least partially evaporated into the air; wherein the PFAS-containing aqueous mixture comprises at least 100 ppm PFAS by weight (in some embodiments at least 500 ppm or at least 1000 ppm PFAS) that the method converts to an effluent comprising 1 ppm or less, or 0.1 ppm or less, or 0.01 ppm or less; wherein by taking a PFOA-concentration wherein the PFAS-containing aqueous mixture comprises at least 100 ppm PFOA by weight (in some embodiments at least 500 ppm or at least 1000 ppm PFOA) that the method converts to an effluent comprising 1 ppm or less, or 0.1 ppm or less, or 0.01 ppm or less, or 1.0 ppb or less, or 0.1 ppb or less, or 0.01 ppb or less PFOA; in some embodiments in the range of 1 ppm to 5 ppt (part per trillion) PFOA. Alternatively, wherein the PFAS-containing aqueous mixture comprises a PFOS-concentration of at least 100 ppm PFOS by weight (in some embodiments at least 500 ppm or at least 1000 ppm PFOS) that the method converts to an effluent comprising 1 ppm or less, or 0.1 ppm or less, or 0.01 ppm or less, or 1.0 ppb or less, or 0.1 ppb or less, or 0.01 ppb or less PFOS; in some embodiments in the range of 1 ppm to 5 ppt (part per trillion) PFOS; wherein the PFAS-containing aqueous mixture comprises 0.5 to 5 or 1 to 3 or about 2 wt % organic fuel; wherein the PFAS-containing solution is mixed with a solution comprising 30 to 50 wt % $H_2O_2$ at a weight ratio of preferably 30:1 to 70:1 wt % ratio PFAS solution:$H_2O_2$; wherein the PFAS-containing solution is passed through a SCWO reactor with a residence time of 20 sec or less, preferably 10 sec, or 5 sec or less, or 0.5 to 5 seconds; wherein the PFAS-containing solution is added at a rate controlled between 50 and 150 mL/min (at STP); wherein no external heating is required after start-up; wherein the PFAS-containing aqueous mixture comprises at least 100 ppm PFOA and the method decreases the PFOA concentration by at least $10^6$ or $10^7$ or $10^8$, and in some embodiments up to about $10^9$; wherein the method is conducted in a mobile trailer; wherein the method is conducted in a mobile trailer at a PFAS-contaminated site; wherein the step of reacting PFAS with an aqueous oxidant occurs under supercritical conditions occurs in a transpiring wall reactor; wherein the PFAS-containing aqueous mixture is a solids-containing mixture (preferably comprising at least 5% or at least 10 wt % solids or at least 15 wt % solids); wherein the method is conducted in a transpiring wall reactor with a curved floor or ceiling.

The invention also includes apparatus for destroying PFAS comprising a SCWO reactor of any of the reactor types described herein.

The invention also includes a system for destroying PFAS comprising a SCWO reactor comprising a PFAS-containing aqueous mixture. The system may comprise any of the conditions and/or fluids described herein.

In another aspect, the invention provides a system for destroying PFAS, comprising: a first inlet conduit for passing a PFAS-containing aqueous stream into a mixing joint; a second inlet conduit for passing a heated stream of clean water into the mixing stream; a conduit connecting the mixing tee to an inlet of a SCWO reactor; an outlet of the SCWO reactor connected to a salt separator; the salt separator comprising an effluent outlet: configured to pass clean water to a heat exchanger that is configured to heat clean water that leaves the heat exchanger and enters the mixing tee, or configured to pass the effluent into the mixing tee.

In a further aspect, the invention provides a method of destroying PFAS, comprising: reacting PFAS under supercritical conditions under continuous operation with minimal corrosion impact by supplying an externally applied electron flood through the system. For historical perspective, when pipes are buried in the ground, say for water plumbing, they are connected to a magnesium block that serves as sacrificial compound. The magnesium is oxidized but not the iron pipes. In our case, an electronic board was designed to supply electrons (an alternative to a sacrificial electrode) that can be controlled to increase the amount of current (electron flow), preferably without increasing the DC voltage. The ability to control the electron flow is desirable because the electron flow is affected by the surface density of materials at the boundary of the fluid and internal surface of the reactor vessel and the temperature of the reaction.

In another aspect, the invention provides a method of destroying PFAS, comprising: reacting PFAS under supercritical conditions in the presence of a eutectic mixture of alkali and/or alkaline earth salts. In supercritical conditions, salts precipitate from water. The precipitates can plug the reactor; however, by selecting mixtures of alkali and/or alkaline earth salts having a eutectic melting point below the conditions in the reactor, the salts remain molten and a precipitate is avoided or reduced.

In a further aspect, the invention provides a method of destroying PFAS, comprising: reacting PFAS with an aqueous solution of hydrogen peroxide at a temperature of at least 100° C. and reaction with an alkali or alkaline earth compound (preferably calcium oxide) or mixtures thereof; to result in at least 90% destruction of the PFAS.

In a further aspect, the invention provides a method water treatment and decontamination, comprising: passing PFAS-contaminated water into a tank, wherein the water is saturated with air; drawing a vacuum in the tank to generate bubbles in the water and create a foamed mixture; passing at least a portion of the foamed mixture into a cyclone air-water separator wherein the mixture is subjected to a centrifugal force; pumping air out of the centrifuged mixture to form a degassed, centrifuged aqueous mixture; and collecting the degassed, centrifuged aqueous mixture. The degassed, centrifuged aqueous mixture will typically contain at least ten times the concentration of PFAS than the water that was passed into the tank.

In a further aspect, the invention provides a method water treatment and decontamination, comprising: passing PFAS-contaminated water into a tank, wherein the water is supersaturated with air; wherein pressure in the tank is relatively low such that bubbles are generated in the water and create a foamed mixture; and collecting the foamed mixture.

In a further aspect, the invention provides a method of corrosion minimization, using an external electron flooding source applied to the reactor.

In another aspect, the invention provides a method of destroying PFAS, comprising: passing an aqueous PFAS solution through a plurality of electrodes; and, subsequently, reacting HF formed with an alkali or alkaline earth element.

In some embodiments, the overall process, or the SCWO portion of the process, can be characterized by taking a PFAS-concentration of at least 100 ppm PFAS by weight (in some embodiments at least 500 ppm or at least 1000 ppm PFAS) to 1 ppm or less, or 0.1 ppm or less, or 0.01 ppm or less. Alternatively, by taking a PFOA-concentration of at least 100 ppm PFOA by weight (in some embodiments at least 500 ppm or at least 1000 ppm PFOA) to 1 ppm or less, or 0.1 ppm or less, or 0.01 ppm or less, or 1.0 ppb or less, or 0.1 ppb or less, or 0.01 ppb or less PFOA; in some embodiments in the range of 1 ppm to 5 ppt (part per trillion) PFOA. Alternatively, by taking a PFOS-concentration of at least 100 ppm PFOS by weight (in some embodiments at least 500 ppm or at least 1000 ppm PFOS) to 1 ppm or less, or 0.1 ppm or less, or 0.01 ppm or less, or 1.0 ppb or less, or 0.1 ppb or less, or 0.01 ppb or less PFOS; in some embodiments in the range of 1 ppm to 5 ppt (part per trillion) PFOS. The process can also be characterized by the same levels of destruction beginning with a PFAS concentration of less than 100 ppm. In some embodiments, PFAS-contaminated water comprising at least 1000 ppt of at least one (or at least 3 or at least 4 or at least 5 or at least 6) compound selected from the group consisting of PFHxA (perfluorohexanoic acid), PFHpA (perfluoroheptanoic acid), PFOA, PFBS (perfluorobutane sulfonate), PFHxS (perfluorohexane sulfonate), PFHpS (perfluoroheptane sulfonate), and PFOS and combinations thereof, treated by the process is (are) reduced by at least 2 (or at least 3 or at least 4 or at least 5) orders of magnitude. In some embodiments, PFAS-contaminated water comprising at least 100 ppt of at least one (or at least 3 or at least 4 or at least 5 or at least 6) compound selected from the group consisting of PFBA (perfluorobutanoic acid), PFPeA (perfluoropentanoic acid), PFHxA, PFHpA, PFOA, 6:2 FTS (6:2 fluorotelomer sulfonate), and 8:2 FTS (8:2 fluorotelomer sulfonate) and combinations thereof, treated by the process is (are) reduced by at least 2 (or at least 3 or at least 4 or at least 5) orders of magnitude and/or reduced to 5 ppt (or 1 ppt) or less.

Various aspects of the invention are described using the term "comprising;" however, in narrower embodiments, the invention may alternatively be described using the terms "consisting essentially of" or, more narrowly, "consisting of."

BRIEF DESCRIPTION OF THE DRAWINGS

FIG. 3 is a drawing of laboratory scale apparatus that was used to remove salt from solution.

FIG. 4A illustrates a tube-in-tube heat exchanger. FIG. 4B is a cut-away view of the heat exchanger.

FIG. 10 schematically illustrates a SCWO reactor with a curved wall in a transpiring transpiring wall reactor.

FIG. 11 illustrates a spray drying system for removing solids.

DETAILED DESCRIPTION OF THE INVENTION

According to the present invention, PFAS-contaminated water has the conventional meaning. The source of the PFAS-contaminated water can be from soil or surface or underground water in areas subjected to PFAS contamination. These areas can be industrial areas, especially where water-proofing or non-stick coatings have been applied. Another common source of PFAS-contaminated water is in areas around airfields or firefighting training areas that have been exposed to AFFF (aqueous film forming foam). Another source can be storage vessels, typically these are accumulated for future destruction or disposal. Typically, there will be non-fluorinated organic compounds present in PFAS-contaminated water and, especially in AFFF residue, there can be chlorinated or brominated compounds.

Pretreatment

Debris and other solids can be removed from the PFAS-contaminated water prior destruction of the PFAS. Typically, this can be accomplished by one or a plurality of filtration steps. In some embodiments, a plurality of filtration steps can be conducted in which increasingly smaller particles are removed. The filters can be valved so that only one or a series of filters can be utilized; for example one filter or a set of filters can be cleaned or exchanged while another filter or set of filters continue to operate. Filters can be any type of filter known for filtering water such as bag filters, cartridge filters, metal screen or sand (preferably silica sand). Alternatively, or in addition, centrifugal separation can be used to remove solids.

The PFAS-contaminated water can be subjected to a softening treatment. These softening treatments may include one or any combination of the following: ion exchange resin, lime softening (aqueous calcium hydroxide to precipitate solids); chelating agents (for example, treatment with EDTA or the like); and reverse osmosis. Reverse osmosis is a preferred treatment for pretreatment. In any pretreatment, capture of PFAS in pretreatment media should be considered. Alternatively, or in addition, compounds such as organics can be removed by passage through hydrophobic clay to remove emulsified oils and granular activated carbon; both of which may absorb PFAS so this use of adsorbent media in pretreatment may require additional treatment steps.

Figure 1:
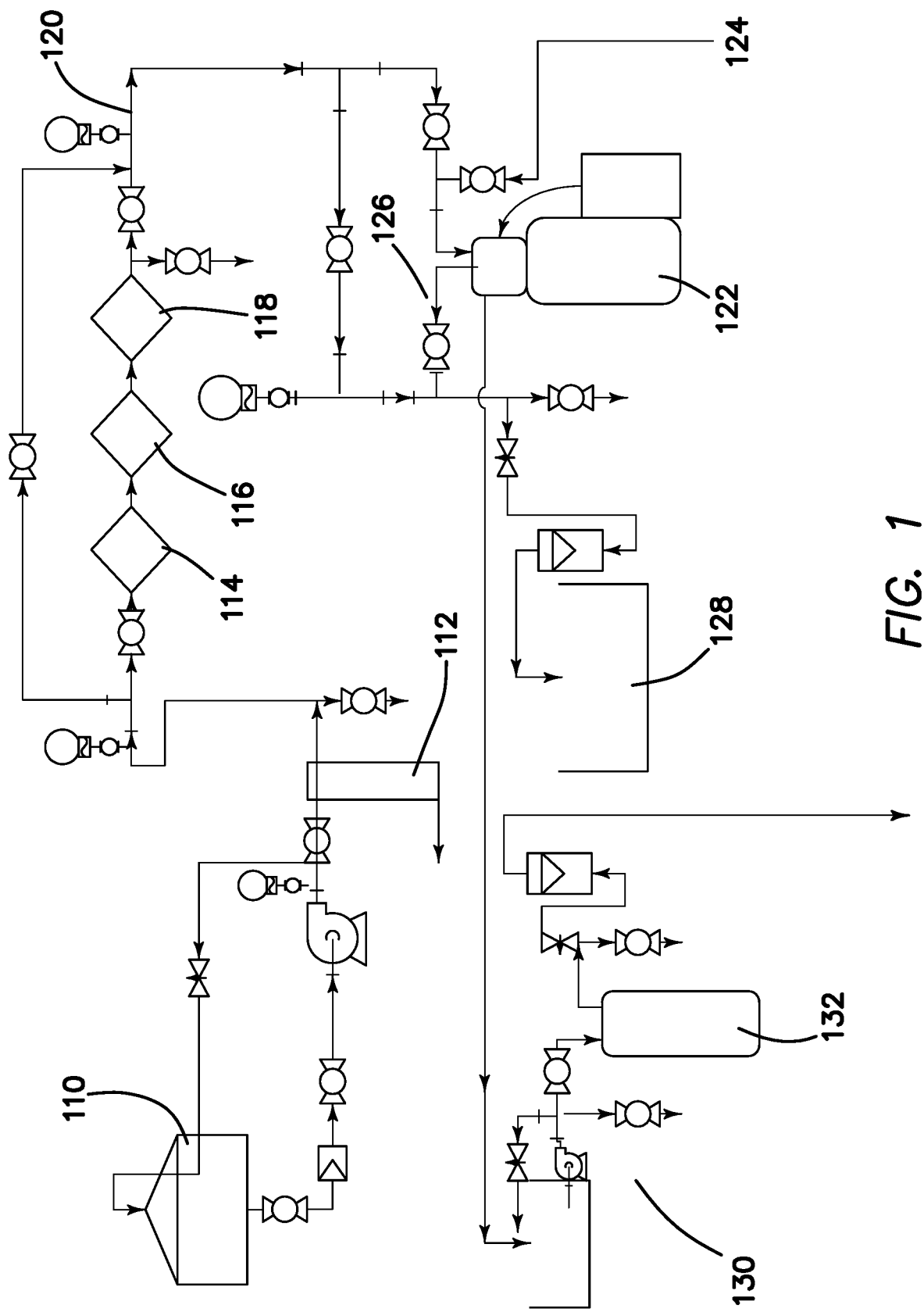
FIG. 1 is a schematic illustration of a water pretreatment system for treating PFAS-contaminated water prior to passage through a SCWO reactor.

One embodiment of a pretreatment system is illustrated in FIG. 1. PFAS-contaminated water from source 110 (such as a feed tank) is pumped through a solids separator 112 and then through optional filters 114, 116, 118. The reduced-solids water 120 can have undesired counterions (typically CA and Mg) removed/replaced in softener 122. If needed, supplemental clean water 124 can be added. Alternatively, or in addition, softened water 126 or water 120 can be passed through a reverse osmosis system 128. The softener 122 can be flushed and the flush water sent to purifier system 130 that may include granulated activated carbon 132 and then discharged or sent to an evaporation holding tank.

Reverse osmosis (RO) systems can remove or concentrate PFAS from water streams. PFAS-free (or PFAS-reduced) water travels through the membrane while the PFAS and salts are directed to a brine stream. Efficiency of PFAS removal and throughput is increased by implementing a cascade of RO membranes. In some embodiments, RO is utilized to increase the concentration of PFAS by at least 5 times or at least 10 times, and in some embodiments in the range of 5 to 30 times or 5 to 20 times.

Figure 2:
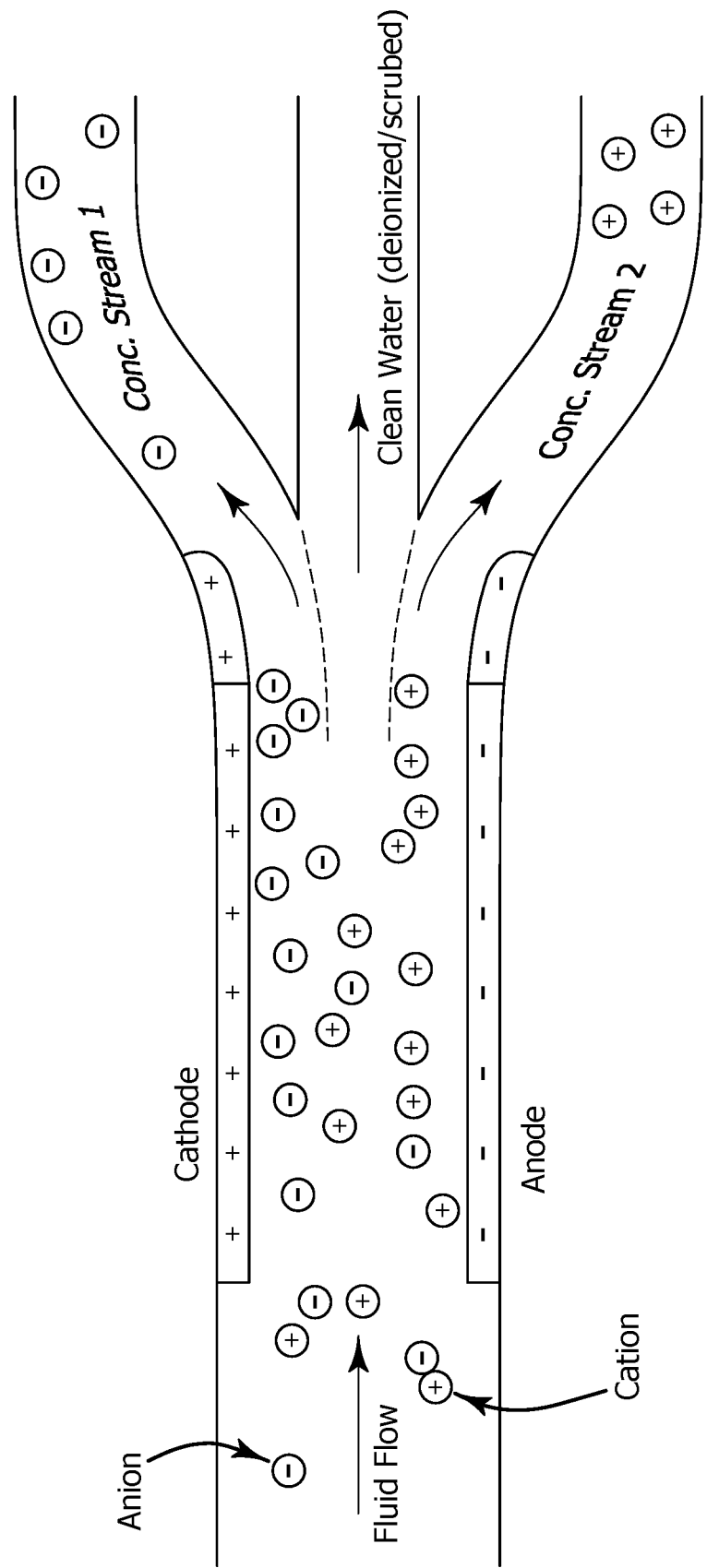
FIG. 2 schematically illustrates separation in an electric field.

Separation in an electric field is another concept that can be applied to water prior to feeding to the reactor or to clean effluent, or both. This concept is schematically illustrated in FIG. 2. A constant electric field is applied to the water. For water flowing toward the reactor inlet, water carrying the PFAS compounds of interest can be concentrated and problematic species can be removed. The effluent of some reactor processes can include heavy metal atoms that can be removed by passage of the water through the electric field. A water stream can be separated into two streams, three streams or more (preferably two or three). The electrostatic plates can be easily swapped and cleaned.

The optional concentration step can be achieved by treating a PFAS-contaminated aqueous mixture with microbubbles causing the PFAS to rise to the top of the mixture where it can be separated. A detailed description of a preferred concentration method is provided below.

As shown in FIG. 3, salt from the PFAS-containing aqueous solution can be removed from the solution by spraying from a small diameter nozzle 302 into a significantly larger volume of an expansion vessel 305 in which water is vaporized, leaving a salt-containing stalactite on the exterior surface of the nozzle. The PFAS-containing aqueous solution can be heated through a heat exchanger, and optionally pressurized, and then passing through a small diameter needle or other nozzle with small outlet orifice or orifices and rapidly expand into a larger volume. In preferred embodiments, the conduit leading to the nozzle is jacketed and heated by an outer stream (which could be a hot recycle stream from the process). The pressure in the expansion vessel is less than, preferably at least five times, more preferably at least ten times less than in the conduit leading into the nozzle. The diameter of the nozzle orifice or orifices is preferably 2.5 mm or less or 1.5 mm or less, in some embodiments 0.5 mm or less. The vapor will flow downstream where it can be condensed prior to passage into a SCWO reactor; in this fashion, clogging and/or corrosion of the SCWO reactor can be substantially reduced. Solids forming on the nozzle 302 can be scraped off or fall off the nozzle. If necessary, solids can be removed from the vapor stream. In some embodiments, the invention includes: salt removal as part of the PFAS destruction process; the salt removal apparatus, preferably as part of a SCWO system or apparatus; and/or a salt containing PFAS attached to the nozzle. Laboratory apparatus used to remove salt from an aqueous solution is illustrated in the FIG. 3 which shows a salt stalactite 304. This apparatus and its use, is a further optional aspect the present invention.

PFAS Concentration from Water Using Vacuum Air Flotation (VAF) and Vacuum Enhanced Cyclone Separation (VECS)

Given the surfactant properties of PFAS, they partition at the air-liquid interface and tend to concentrate at the air—water interfaces of the surface water bodies. Wave action introduces the air bubbles and results in the formation of foam. Laboratory research has demonstrated that bubbling air through PFAS-contaminated water can achieve removal of PFAS (Meng et al., Chemosphere (2018), "Efficient removal of perfluorooctane sulfonate from aqueous film-forming foam solution by aeration-foam collection."). Dickson in US 2014/0190896 discusses the use of vigorously mixed ozone to treat industrial waste; lighter foam produced in the process is directed by a foam concentrator into a fractionate chamber. Prior art processes have issues associated with large amounts of air bubbled through the water creating large amounts of foam that is difficult to manage as well as concerns over aerosols being emitted.

In some aspects of the present invention, the combination of VAF and VECS optimizes the removal and overcomes the issues described above. The principle of VAF is to produce micro-bubbles (appearing as cloudy water) inside a treatment cell by injecting air (nitrogen and oxygen)-saturated water into the bottom of the cell that is maintained under high vacuum conditions. Once the air-saturated water enters the low-pressure environment, the water becomes supersaturated with air and thus the air would drop out of solution creating micro-bubbles. Unlike bubbling air into a tank, these bubbles would be so fine that they would essentially occupy the entire floatation chamber and would rise very slowly allowing much greater contact between air and PFAS than what could be achieved via air sparging. In addition, a very low volume of air would be introduced into the cell in comparison to what would be injected in a sparging application. This allows the PFAS to be "scrubbed" and gently floated to the top of the chamber. The treatment cell preferably has several floatation cells in series separated by baffles. The forward flow would flow via gravity from one floatation chamber to the next. The use of in-series chambers would enhance treatment efficiency. For example, if each cell achieved 75% removal of PFAS, having three chambers in series would achieve 98% removal and four cells would achieve greater than 99.5% removal.

The air-saturated water can be generated in a simple vessel where air is bubbled through water. The water is preferably drawn from an uncontaminated source, possibly treated effluent. The air-saturated water would be drawn into the floatation chambers, as those chambers are under a vacuum, thus no pumping is needed for this water.

The foam from each chamber would overflow into separate foam collection sections of the tank, which are under vacuum as this is all part of one enclosure. This prevents aerosols from being emitted and even if there is leakage in the tank, air would leak in rather than aerosols leaking out. The foam from the later chambers would tend to be more dilute and could be sprayed down with effluent to break the foam and then would be recycled back to the inlet of the treatment cell. The foam from the first chamber would be highly concentrated and could be sucked out from a pipe that is connected to the same vacuum pump that is used to create the vacuum for the treatment cell. A high air flow rate would be generated by recycling the air flow and this creates a high velocity that can facilitate the withdrawal of the foam. The mixture of foam and air would be sent to a cyclone air-water separator that is still under vacuum. Having the foam under vacuum will enhance foam breaking because, when under vacuum, the air bubble will become larger and less stable. Within the cyclone air-water separator, a high centrifugal force will be created as the mixture enters the separator tangentially to the cylindrical wall creating a centrifuge effect. The combination of the centrifugal force and the high vacuum helps break the foam and allow the air to separate from the concentrated PFAS solution. The air goes out the top of the separator and is drawn into the vacuum pump (e.g. a liquid ring pump). Most of the discharge of the vacuum pump is recirculated to the treatment cell to recover the foam from the cell. A small amount of air is emitted. Theoretically, the amount of air emitted would be as low as the amount of air that was dissolved into the clean water tank and injected into the bottom of the floatation chamber, which would be an extremely low volume. This small amount of air is emitted to the atmosphere but if found to be necessary, can go through a demister unit to help ensure that no entrained liquid is carried out with it. The aqueous solution in the air-water separator and out of the demister is pumped out and contained for disposal (e.g., destruction either on-site or off-site) or further concentrated (e.g., batch flocculation with settling to create a sludge). Tests using simple aeration were found to be able to achieve an enrichment factor or 8400 (Meng et al 2018). For example, with an influent water flow rate of 100 gpm, the amount of waste generated would be 17 gallons per day. It is possible this can be enriched further (maybe one or two more orders of magnitude depending on the influent concentration) with this process to reduce the volume more. For example, if the influent contains 1 ug/L (or 1000 parts per trillion) of PFAS and we can concentrate the solution to achieve 0.1% PFAS (or 1000 parts per million), we would achieve a million to one enrichment factor. In the example above, instead of 17 gallons per day, we would produce only 52 gallons per year. The lower volumes of water are be more amenable for on or off-site destruction methods as well as on site precipitation to create a much smaller volume of sludge.

Regarding the cost effectiveness of this system, consider that no chemicals or media are required, and the entire process is driven mostly by a vacuum pump. The vacuum pump draws the air-saturated water in as well as recirculates the air needed to draw the foam out of the treatment cell. A small blower is needed to bubble air into the clean water tank and water needs to be pumped out of the treatment cell. The baffled tank can be custom designed and have several baffled sections. The cycle separator and demister can be commercial units. Once operational, no materials need to be consumed other than electricity for the mechanical equipment and very little waste is generated—possibly zero waste if an on-site destruction unit is used on the low volume of concentrated solution.

In another aspect of the present invention, the use of dissolved air floatation (DAF) facilitates removal of PFAS. The principle of DAF is to produce micro-bubbles (appearing as cloudy water) inside a treatment cell by first creating what is known as white water, which is pressurized water (typically to pressures of approximately 75 pounds per square inch gauge [psig]) that is saturated with air (nitrogen and oxygen). Once the white water enters an atmospheric pressure environment, the water becomes supersaturated with air and thus the air drops out of solution creating micro-bubbles. Unlike bubbling air into a tank, these bubbles would be so fine that they would essentially occupy the entire floatation chamber and would rise very slowly allowing much greater contact between air and PFAS than what could be achieved via aeration/air sparging. In addition, a very low volume of air would be introduced into the cell in comparison to what would be injected in a sparging application. This allows the PFAS to be "scrubbed" and gently floated to the top of the chamber. The treatment cell preferably has several floatation cells in series separated by baffles. The forward flow would flow via gravity from one floatation chamber to the next. The use of in-series chambers will enhance the treatment efficiency. For example, if each cell achieved 75% removal of PFAS, having three chambers in series would achieve 98% removal and four cells would achieve greater than 99.5% removal.

The white water can be generated in a pressure vessel where air is bubbled through water or it could be generating by inducing air into the outlet of a pump (e.g. centrifugal pump) either using a venturi injector or a compressor. The source of the water would typically be recycled effluent. The white water is then injected into each floatation chamber.

The foam from the first chamber would overflow into a foam collection section of the tank where it would be given time for the foam to break down into a low volume of concentrated PFAS solution. This first chamber is referred to as the Concentration Stage as this stage has not only the objective of removing PFAS from the forward flow but also to allow the foam that gets removed to be as highly concentrated as possible.

Each subsequent chamber (referred to as a Polishing Stage) would have continuous skimming from the top with the skimmed water being collected and sent back to the Concentrator Stage for further concentration but these stages would also have the ability of functioning similarly as the Concentrator Stage through an operational control.

The use of white water to create microbubbles instead of aeration/sparging results in an extremely low amount of air that emits from the surface of the water and little agitation at the water surface. This prevents aerosols from being emitted and results in more manageable foam. It also reduces energy consumption as it eliminates the need for blowers/compressors to be generating large volumes of pressurized air.

For influent that is more highly contaminated with PFAS, greater amounts of foam from the first chamber would be produced. If necessary, an optional cyclonic separator can be applied where a vacuum pump is used to suck out foam from the foam collection vessel. A high air flow rate would be generated by recycling the air flow and this creates a high velocity that can facilitate the withdrawal of the foam. The mixture of foam and air would be sent to a cyclone air-water separator that is still under vacuum. Having the foam under vacuum will enhance foam breaking because, when under vacuum, the air bubble become larger and less stable. Within the cyclone air-water separator, a high centrifugal force is created as the mixture enters the separator tangentially to the cylindrical wall creating a centrifuge effect. The combination of the centrifugal force and the high vacuum helps break the foam and allow the air to separate from the concentrated PFAS solution. The air leaves the top of the separator and is drawn into the vacuum pump (e.g. a liquid ring pump). Most of the discharge from the vacuum pump is recirculated to the foam collection vessel for foam recovery. A small amount of air is emitted. Theoretically, the amount of air emitted would be as low as the amount of air that was entrained as part of the foam. This small amount of air is emitted to the atmosphere but if found to be necessary, can go through a demister unit to help ensure that no entrained liquid is carried out with it. If the optional cyclonic separation is necessary, consideration should be given to using a modification of this DAF technology referred to as "PFAS Removal from Water using Vacuum Air Floatation (VAF) and Vacuum Enhanced Cyclone Separation (VECS)".

The concentrated PFAS solution is pumped out and contained for disposal (e.g., destruction either on-site or off-site) or further concentrated (e.g., evaporation). The volume of this liquid would be very low, but testing is needed to determine how low. Tests using simple aeration was found to able to be able to achieve an enrichment factor or 8400 (Meng et al 2018). For example, with an influent water flow rate of 100 gpm, the amount of waste generated would be 17 gallons per day. It is possible this can be enriched further (maybe one or two more orders of magnitude depending on the influent concentration) with this process to reduce the volume more. For example, if the influent contains 1 ug/L (or 1000 parts per trillion) of PFAS and we can concentration the solution to achieve 0.1% PFAS (or 1000 parts per million), we would get a million to one enrichment factor. In the example above, instead of 17 gallons per day, we would produce only 52 gallons per year. The lower volumes of water are more amenable for on or off-site destruction methods as well as on site precipitation to create a much smaller volume of sludge.

Regarding the cost effectiveness of this system, consider that no chemicals or media are required, and the entire process is driven mostly by a water pump that generates a pressure of about 75 to 100 psig. The baffled tank can be custom designed and have several baffled sections. Once operational, no materials need to be consumed other than electricity for the mechanical equipment and very little waste is generated—possibly zero waste if an on-site destruction unit is used on the low volume of concentrated solution.

Preheating

PFAS-containing water is carried through lead line 4102 into the heat exchanger where it exchanges heat with exchange fluid that enters the heat exchanger in the lead line 4104 prior (typically immediately prior) to entering the reactor. Heat from the reactor is used to heat water entering the reactor. The use of a heat exchanger makes the process more energy efficient, compact and extends service life of the reactor. A tube-in-tube heat exchanger is especially desirable. We have implemented and tested the heat exchanger illustrated in FIGS. 4A and 4B.

Supercritical Water Oxidation (SCWO)

Start-up requires additional heat generated by electricity or gas to heat a thermal sink such as a sand bath. If a supplemental fuel in the feed stream is being oxidized, little or no external heat need be supplied after start up. Fuels can be any organic compounds that will easily oxidize under the conditions in the oxidation reactor. Preferred fuels include alcohols, such as methanol or isopropyl alcohol, acetone, or any other, preferably water-soluble, organic fuels.

Alkali or alkaline earth elements can be added with the concentrated PFAS solution into the oxidation reactor. Alternatively, alkali or alkaline earth elements can be added to the effluent that exits the oxidation reactor. For example, there may be little or no alkali or alkaline earth elements added to the PFAS-contaminated aqueous mixture that enters the reactor (except for the Na that is exchanged for less desired counter ions in an optional water softening pretreatment), while the effluent is treated with a NaOH solution to neutralize the solution and convert the HF in the effluent into sodium fluoride and water. The addition of the alkali or alkaline earth elements (preferably in the form of NaOH) can be added at any point subsequent to the SCWO and preferably after the solution is no longer supercritical. The resulting basic solution can be recycled to again neutralize the effluent, preferably in a continuous process in which sodium hydroxide is added as-needed. The neutralized effluent may be passed through a heat exchanger to heat up the PFAS-contaminated aqueous mixture prior the contaminated mixture enters into the oxidation reactor; and the relatively-cooler effluent may then be recycled, released to the environment, or subjected to additional treatments either on-site or at a water treatment facility.

Per- and Polyfluoroalkyl Substances (PFAS) are destroyed and converted to carbonates, fluoride salts and sulfates. The destruction or conversion of PFAS is achieved by the synergistic effect of temperature, pressure, addition of water, an oxidant and, optionally, an alkali or alkaline earth element (or mixtures thereof). The alkali or alkaline earth element may be added in the feed into the reactor or, preferably, into the effluent to remove HF. A compound such as CsOH, NaOH, KOH, or LiOH may be added to respectively make CsF, NaF, KF, or LiF. $Ca(OH)_2$. A quench at the very end of the oxidation process may be added to remove HF to form NaF or $CaF_2$ (for example). This process is essentially combustion of the organic molecules in water minus the 1) flame and 2) associated environmental contaminants that are harmful to the environment. The most notable products of the oxidation reaction are carbon dioxide and water, which are environmentally friendly. The fluoride (such as $CaF_2$) can will be removed from the water and separated for further processing if needed. The process water can be reused for the system.

In one preferred system according to the invention is designed to destroy PFAS at a rate of at least 100 kg or at least 200 kg per hour of PFAS, in some embodiments in the range of 100 to 500 kg per hour of PFAS. To meet throughput requirements and schedule, parallel devices can be used. Furthermore, tandem SCWO will be used to increase the reactor cross-section to amplify throughput. The system may incorporate features such as 1) multiple injection-reaction points, 2) helical reaction pathway implemented using a magnetic field, 3) "after burner" minus the flame. In the traditional SCWO, there is only a single head injection point of PFAS loaded/organic loaded influent. The performance of SCWO can be turbo-boosted by using multi-injection points hence, increasing the operational throughput of the system by orders of magnitude. There are multiple reactive charge species produced in the reaction chamber and those are influenceable by a magnetic field and can be focused or diffused depending on the need to ensure frequency of interaction or reaction cross-section is amplified. The afterburner is a SCWO configuration that allows further treatment of effluent prior to cooling if additional destruction efficiency is required.

The device can be designed for 1) stationery applications or 2) transportation to a site. The stationery configuration can be employed at a permanent processing plant such as in a permanently installed water facility such as city water treatment systems. The portable units can be used in areas of low loading requirement where temporary structures are adequate. A portable unit is sized to be transported by a semi-truck or smaller enclosed space such as a trailer or shipping container.

The design is adaptable to processing other organic contaminants by modifying operational parameters but without modification of the device.

Passivation of Interior Surfaces of SCWO Reactor

The interior surfaces of the reactor can be coated with corrosion resistant materials such as platinum aluminide, B4C (boron carbide), SiC (silicon carbide), TaC (tantalum carbide), WC (tungsten carbide), metal fluorides such as YF3 (yttrium fluoride), YN (yttrium nitride), LaF3 (lanthanum fluoride), LaN (lanthanum nitride), YbN, YbF3, or any lanthanide nitride or lanthanide fluoride, HfN (hafnium nitride), CeN (cerium nitride), CeF3 (cerium fluoride), TaN (tantalum nitride), Ta (tantalum), TaF (tantalum fluoride), ZrN (zirconium nitride), ZrF (zirconium fluoride), WC (tungsten carbide), WN (tungsten nitride), or combinations thereof.

Alternatively or in addition, corrosion can be reduced by use of a sacrificial electrode or impressed current cathodic protection.

Destruction by Continuous or Batch Reactor

The SCWO system operates by raising the feed temperature and raising the feed pressure. The increased pressure can be due solely due to the heating (which is preferably) or can be further increased via a compressor or a high pressure (reciprocating) pump. The temperature is increased by: application of heat through the conduit (in the case of a continuous reactor) or through the reaction chamber in the case of a batch reactor, and/or by the addition of fuels such as alcohols that will be oxidized to generate heat in solution. Supercritical conditions are maintained for the oxidation; conditions within the reaction conduit or reaction chamber are preferably in the range of 374° C.-1200° C. and at least 220 bar, more preferably 221-300 bar. In some embodiments, temperature in the SCWO reactor is maintained at 500° C. or more, or 600° C. or more and in the range of 500 or 600 to 700° C. or 800° C.

Handling the Fluorine by-Products from Destruction of PFAS

A key step in the inventive processes is the handling of fluorine. HF (hydrofluoric acid) is corrosive and toxic and cannot be released into the environment.

The expected full-oxidation reaction for PFOA is:

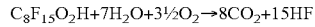

An alternative reaction or additional reaction is to add CsOH+NaOH or KOH+LiOH to the input to balance the ions and avoid HF.

CsF, NaF, KF, and LiF are salts that are more environmentally friendly than HF

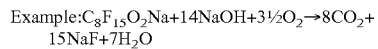

These salt combinations were carefully chosen because they have eutectic points below the temperature of our reactor, so the fluid travels through as molten material instead of as solid, an undesired fluid physical state. For example:

CsF—NaF, 23.5 mol % NaF to total salt mixture— Eutectic Point 609° C.

KF—LiF, 50 mol % KF to total salt mixture—Eutectic Point 485° C.

These salts are insoluble in supercritical water, but soluble in liquid water. A solid particulate could foul the reactor and cause it to plug.

Figure 5:
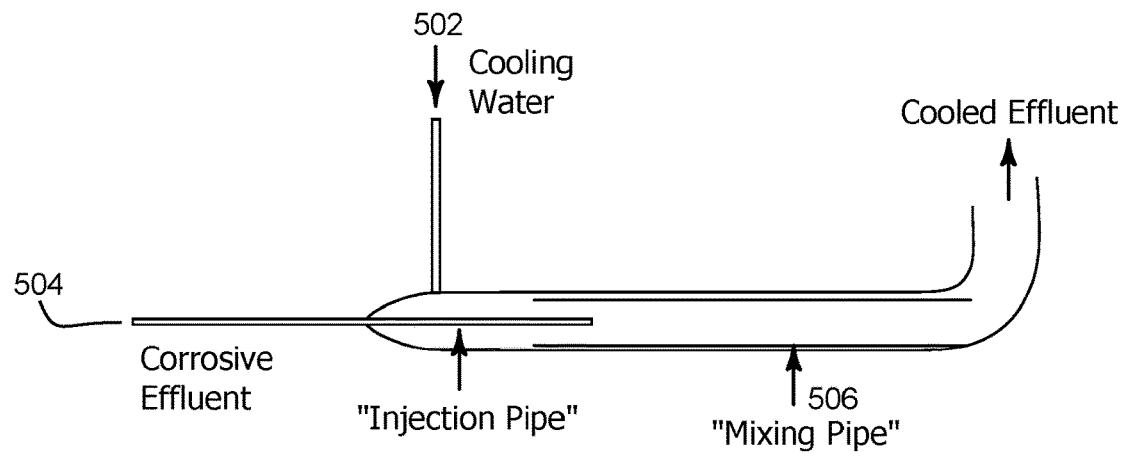
FIG. 5 illustrates a system for handling corrosive effluent containing aqueous HF at high temperature.

The corrosive effluent containing aqueous HF at high temperature (for example, around 700° C.) can flow into a mixing pipe. Cooling water, typically containing hydroxy salts, enters through lead line 502 where it mixes with the corrosive effluent effluent which enters through injection pipe 504 and are combined into mixing pipe 506. The cooled effluent contains dissolved fluoride salts such as NaF. This system is illustrated in FIG. 5.

A preferred SCWO reactor design is a continuous or semi-continuous system in which the (typically pre-treated) PFAS-containing aqueous solution is passed into a SCWO reactor. In some embodiments, the aqueous solution is separated into a PFAS-enriched fraction and a PFAS-depleted fraction. The PFAS-depleted fraction is heated before passage into the SCWO reactor and then combined with a PFAS-depleted fraction (either the same PFAS-depleted fraction, in which case the fractions are recombined, or another PFAS-depleted fraction); by reducing the time and volume in which the PFAS-contaminated solution (which may also contain salts) is heated, corrosion can be reduced which both extends the lifetime of the apparatus, reduces contaminants such as heavy metals in the effluent, and may reduce clogging in the SCWO reactor.

Because solids form in the SCWO reactor it is desirable for the reactor to slope downward so that solids are pulled by gravity downward and out of the reactor. In some embodiments, the flow path is straight and vertical (0°) with respect to gravity; in some embodiments, the reactor is sloped with respect to gravity, for example in the range of 5 to 70° (from vertical) or 10 to 50° or 10 to 30° or 10 to 20° and can have a bend so that flow moves in a reverse direction to provide a compact device in which flow is consistently downward with respect to gravity. Preferably, the reactor vessel is a cylindrical pipe formed of a corrosion resistant material. Desirably, the pipe has an internal diameter of at least 1 cm, preferably at least 2 cm and in some embodiments up to about 5 cm.

Flow through the components of the SCWO apparatus at supercritical conditions should be conducted under turbulent flow (Re of at least 2000, preferably in the range of 2500 to 6000). Effluent from the SCWO reactor can flow into a salt separator under supercritical conditions.

Figure 6A:
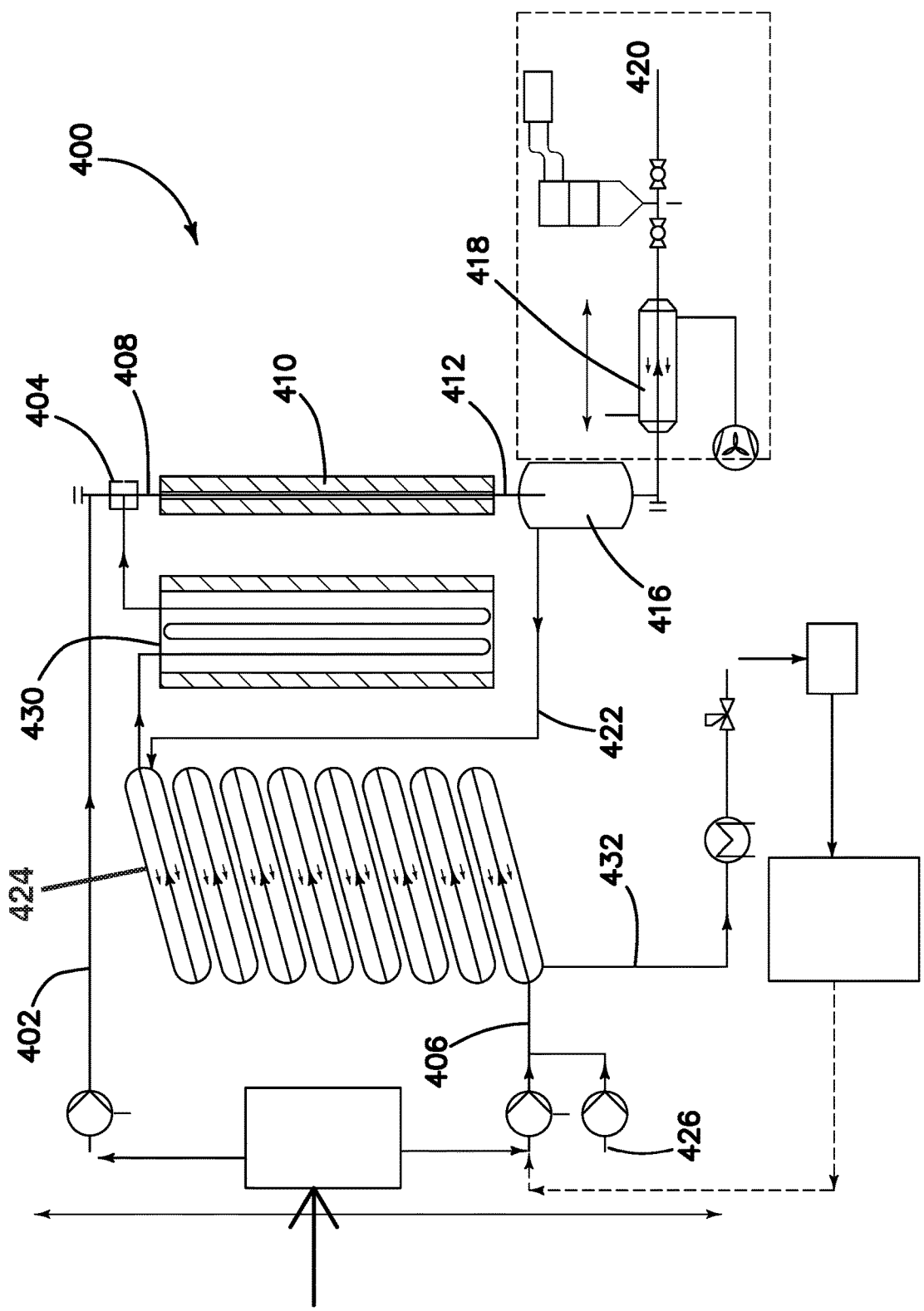
FIG. 6A illustrates a SCWO system for the oxidation of PFAS.

A preferred system 400 is illustrated in FIG. 6A. PFAS-contaminated water (feedstock) 402 enters mixing tee 404. The PFAS-contaminated water enters the tee at ambient conditions (room temperature) or relatively low temperature so that the inlet line is not corroded. In the mixing tee, the PFAS-contaminated water 402 is mixed with hot, clean water 406 which may be, for example, 650° C. The combined stream is at a combined temperature. The oxidant 426 can be in either stream 402 or 406 but is preferably in 406 to prevent premature reaction. Preferably, the fuel (if present) is in the stream that does not contain the oxidant. Combined stream 408 passes into SCWO reactor 410 which is preferably a vertical (with respect to gravity) tube surrounded by insulation and heating means for start-up. Temperature in the SCWO reactor is preferably in the range of 500 to 700° C. The effluent 412 passes into salt separator 414 where salt 416 where it can be removed manually or through exhaust system 418 leaving the system as brine 420. Salt 416 can be a mixture of sodium chloride, sodium fluoride, sodium sulfate, sodium nitrate or corresponding salts of other alkali or alkaline earth elements. Supernatant 422 leaves the separator and is routed through a heat exchanger 424, preferably in the direction indicated such that temperature of fluid 422 is highest where the clean water 406 leaves the heat exchanger. After passing the heat exchanger, clean water stream 406 may optionally be passed through heater 430 to heat the water preferably to 600° C. or higher. After passing through the heat exchanger, effluent 432 can leave the system and optionally be neutralized at any point after exiting the SCWO reactor. All or a portion of the effluent can also be recycled into the system and/or released into the environment or a water treatment facility.

Figure 6B:
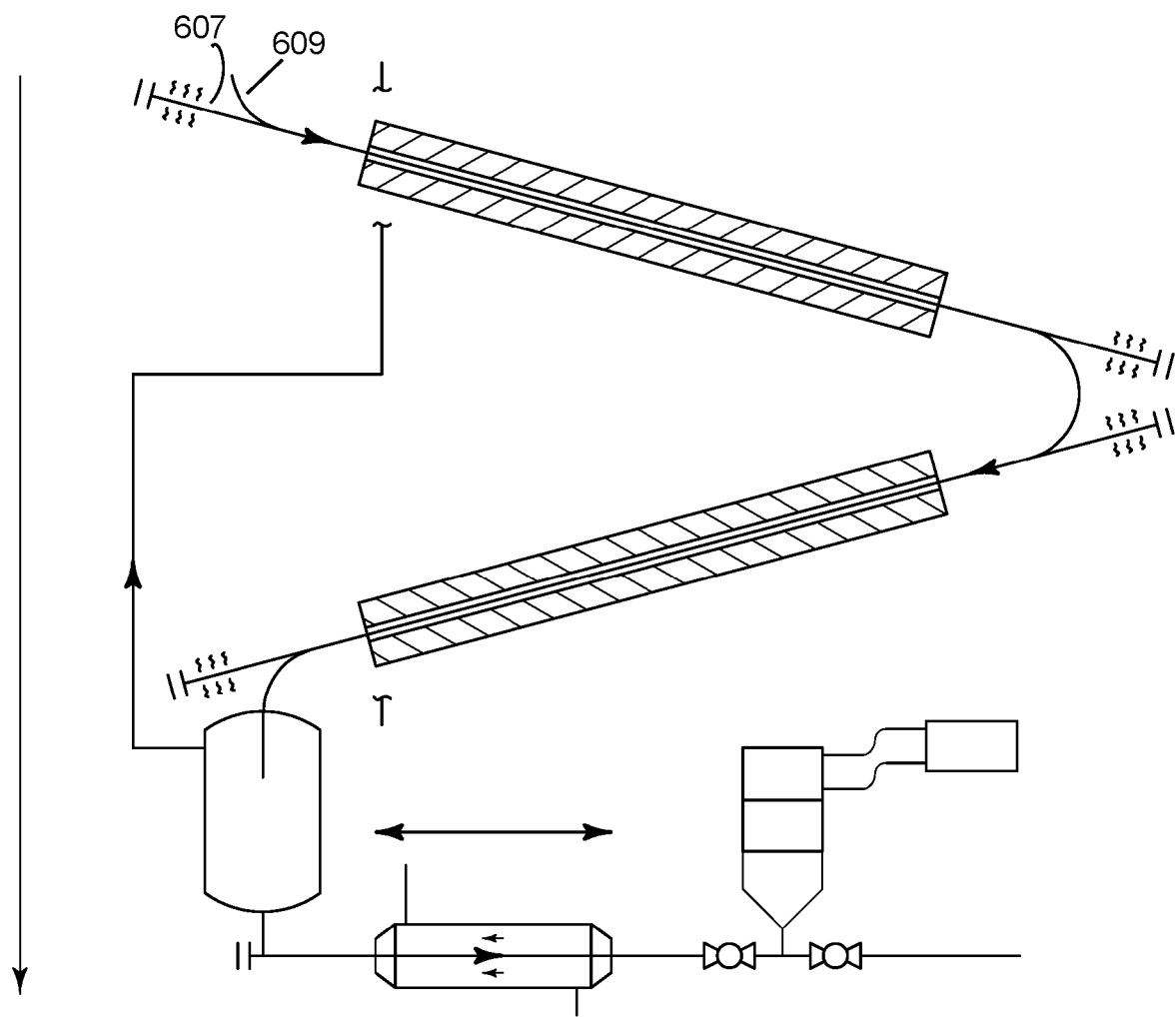
FIG. 6B illustrates a compact SCWO system for the oxidation of PFAS.

Another reactor configuration is shown in FIG. 6B; this is similar to the reactor of FIG. 6A except the reactor is sloped with respect to gravity. PFAS-containing water enters reactor through lead line 607 and mixes with oxidant entering the reactor in line 609.

Oxidants

The two tested feedstocks of reactant oxygen used in supercritical water oxidation for destruction of PFAS are oxygen gas ($O_2$) and hydrogen peroxide ($H_2O_2$). In addition to, or alternative to, these two chemical species, other reactant oxygen sources or oxidizing agents could be added to destroy PFAS in the oxidation reactor. Other oxidants are oxyanion species and peroxy acids. These include, but are not limited to, ferrate salts ($FeO_4^{2-}$), percarbonate salts (ex. $C_2K_2O_6$), permanganate salts (ex. $KMnO_4$), potassium peroxymonosulfate (commercially known as Oxone), peroxybenzoic acid, and ozone ($O_3$).

Oxyanion species are a category of chemicals that includes, but is not limited to, ferrate ($FeO_4^{2-}$), percarbonate ($CO_4^{2-}$), permanganate (ex. $MnO_4^-$), and Oxone. The general trend of these species is that at above ambient environmental conditions, the rate of oxygen release increases. The inventive system can operate at an elevated temperature and pressure to achieve supercritical water conditions. Under these same conditions, oxyanion species readily decompose and release their oxygen. Therefore, oxyanion species have the potential to be incorporated as a source of reactant oxygen; however, the addition of elements such as Mn introduces the possibility of formation of additional solids that can plug the reactor.

Peroxybenzoic and other peroxy acids are generally regarded as oxidizing agents. Historically they are predominantly used to oxidize alkenes to epoxides, Baeyer-Villiger oxidation of ketones to ester and lactones, and oxidation of heteroatoms to oxides (amines to amine oxides, sulfides to sulfoxides and sulfones, selenides to selenoxides, phosphine to phosphine oxides). In the present invention, a peroxy acid has the potential to be an oxidizing agent for PFAS destruction.

Ozone is unstable in neutral water solution and typically decomposes into $O_2$ and another species. In this way, ozone has the potential to be the source of reactant oxygen for the inventive processes.

The preferred oxidant is hydrogen peroxide which can be added in excess (for example an excess of at least 50% or at least 100% or in the range of 50% to 300% excess) and the excess hydrogen peroxide reacting to form dioxygen and water.

Fuels

From 0.5 to 5 or 1 to 3 or about 2 wt % organic fuel (for example, isopropyl alcohol) burns with enough energy to heat our reactor from 450° C.-600° C. At start-up we need to heat (electrically) from 20 to 450, then the IPA will ignite, burn, and heat the fluid to 600° C. (our target reactor temperature) inside the reactor. Once we have this running, we will use the heat from the reactor to pre-heat the fluid (instead of electric sand bath) so that the reaction runs isothermally at steady-state. However, the sand bath or other heat sink can be used as a heat exchanger to heat the pre-heating tubes from the reactor coil.

The addition of fuel operates at any selected scale and flow rate. For example, if 100 gallons of PFAS contaminated water is treated with 2.54 gallons of isopropyl alcohol (density=0.785 g/mL), then if you have 100 k gallons, it can be treated with 2540 gallons of IPA. Alternatively, the quantity of fuel can be calculated based on the heat required; for example, oxidation of IPA produces 1912 kJ/mol, IPA has a molecular weight of 60.1 g/mol, then if ~20 mg/mL of PFAS water is needed, then 0.64 kJ/mL of PFAS solution is required.

We have also calculated that we could run isothermally at steady-state if the PFAS solution contained 7 wt % PFAS (well above the solubility limit, so not typically feasible). The destruction is exothermic and matches the heat we need to heat the fluid.

Destruction by Synergistic Application of High Temperature, High Pressure, and Hydrogen Peroxide PFAS in water is mixed with Hydrogen Peroxide and Calcium Oxide. The solution is mixed, and placed inside a pressure vessel maintained at high temperature (for example, at least 250 F or at least 300 F, in some embodiments in the range of 250 or 300 F to 500 F) and a pressure of at least 2 atm, preferably at least 3 atm, for example, pressurized to 5 atmospheres with nitrogen for 3 hours. The resultant precipitate formed in the reaction vessel can be separated from the supernatant liquid. PFAS are extremely unreactive. We discovered, surprisingly, that greater than 99% destruction could be achieved at relatively mild conditions by the reaction of PFAS with a combination of aqueous hydrogen peroxide and alkali or alkaline earth elements (or high temperature and increased pressure as above). The calcium oxide is added to the reaction mixture to quench the HF formation, which results in the formation of Calcium fluoride. Thus, the invention includes the reaction of PFAS with an aqueous solution of hydrogen peroxide and calcium oxide at a temperature of at least 100° C., preferably in the range of 120 to 200° C., or in the range of 130 to 170° C. or 140 to 160° C. Preferably, at least 90% or at least 95% or at least 99% of the PFAS is destroyed by the method.

Additional Conditions

Any of the inventive processes can be characterized by one or any combination of the following. A temperature profile of heating the oxidation reactor to a temperature of at least 450 C to ignite fuel in the feed. In some preferred embodiments a PFAS-containing solution is mixed with a solution comprising 30 to 50 wt % $H_2O_2$ at a weight ratio of preferably 30:1 to 70:1 wt % ratio or in a particularly preferred embodiment approximately 50:1 PFAS solution: $H_2O_2$. In some embodiments, the PFAS-containing solution is passed through a SCWO reactor with a residence time of 20 sec or less, preferably 10 sec, or 5 sec or less, or 0.5 to 5 seconds. In reactors in which the PFAS is destroyed in supercritical conditions, the reactor volume is based on the volume comprising supercritical fluid conditions. A preferred reactor configuration is a continuous plug flow reactor. In some tests, the feed of concentrated PFAS is passed into an oxidation reactor a rate of about 50 mL/min; in some embodiments rate is controlled between 50 and 150 mL/min (at STP); this rate can be adjusted to obtain the desired conditions. The feed can include fuel and oxidant. Preferably, no external heating is required after start-up. In some embodiments, the PFAS-containing aqueous mixture (preferably after a concentration pretreatment) comprises at least 100 ppm PFOA and the method decreases the PFOA concentration by at least $10^6$ or $10^7$ or $10^8$, and in some embodiments up to about $10^9$.

Any of these conditions may be utilized or obtained in a mobile unit.

Supercritical Oxidation Treatment of PFAS-Contaminated Solids

Input unsorted solid samples (for example, soil) with unknown particle size distributions are subjected to a fluidizing pressure of SCWO of variable flow. Controlling the flow allows for particle density inversion and separation of the soil into its granular constituents (sand, silt, clay organics). This fluidizing 'floor' will cause rapid permeation of SCW through the solid sample while sorting by size distribution based on the pressure. The 'ceiling' of the chamber will be a traditional transpiring wall of SCW to discourage salt accumulation and enable further SCW penetration by the solids.

Curving the 'floor' and 'ceiling' areas will cause a natural pressure gradient along the angle, giving a natural decrease in fluidization pressure vs gravity without complex pressure adjustments. As particles drift in the chamber they will prefer the angular location which fluidizes them past their inversion point, naturally segregating the soil from the salts and output gases. Larger particles are exposed to longer treatment times while gas and salt are removed. Cleaned soil leaves during pressure cycles. The output of the chamber can collect salts in a brine chamber and the output gases as with a traditional TWSCW reactor. This is illustrated in FIG. 10 in conjunction with a transpiring wall with preheated PFAS feedstock entering the reactor with gas and solution leaving toward the top and solids from the bottom.

SCWO is currently done at scale only on aqueous samples, or colloids suspended in a carrier fluid. This approach naturally treats solids without pre-sorting or water suspension. This design also scales up quickly in the dimensions and can be parallelized. Since SCWO reactors are exothermic, the entire process can be thermally and electrically self-sustaining after its initial startup. This reactor design applies to spent activated carbon, chemically contaminated stone, municipal solid waste treatment, as well as to soil samples.

Other solutions include a traditional transpiring wall reactor, tubular reactors, reverse flow tanks, or film cooled reactors. A transpiring wall reactor can be useful for SCWO destruction of PFAS, especially solids. Transpiring wall prevents salts and acids from extended contact with reactor walls while ferrying away solids in turbulent flow.

By applying fluidization this removes many problems in SCWO scaling. First, soil samples can be treated in large volumes at large speeds (for example, at least 10 kg/hr or at least 50 kg/hr; in some embodiments up to about 500 kg/hr or 300 kg/hr) without presorting or pretreatment. Next, fluidizing SCW greatly increases particle penetration, and preferentially penetrates smaller particle sizes more than larger ones. Contaminants such as PFAS prefer to bond to smaller soil particles, so this would enhance the destruction rate. Lastly, the use of the curved design removes hydraulic complexity from a variable fluidizing design, making the system more robust. This also provides tremendous opportunity for further innovation, such as creation of intentional turbulence in the reactor volume through time-varying fluidization pressure.

Mobile Units

One example of a mobile unit can be transported (and preferably operated within) a trailer. For example, the system can be transported (and optionally operated) on a trailer having dimensions of 29 feet (8.8 m) in length or less, 8 ft 6 in (2.6 m) or less width, and 13 ft 6 in (4.1 m) height or less. These dimensions define preferred size of a mobile system, although workers in this area will understand that other dimensions could be utilized in a mobile unit.

Post Treatment

Since the oxidation process destroys essentially all of the PFAS, the treated effluent can be safely released back into the environment. In some embodiments, at least a portion of the effluent is evaporated into the air. This is safe since the PFAS has been destroyed and any remaining contaminants (such as metals, NaF, etc.) tend to have very high vapor pressure so that they do not evaporate with the water. The effluent may be subjected to treatments such as reverse osmosis and/or other treatments (Metsorb™, etc.) to remove metals or other contaminants prior to release or disposal of the effluent.

Precipitates such as fluoride salts can be filtered or centrifuged from the effluent. PFAS-free effluent can be passed through the heat exchanger where the effluent is cooled by the PFAS-contaminated water flowing into the reactor. The effluent can be flashed and/or evaporated. Other techniques such as RO, chelation, and/or passage through sorbent can be used to remove impurities such as metals from the effluent.

Solids can be removed by spray drying as illustrated in FIG. 11. Effluent can be sprayed into a stream of hot air. Water rapidly evaporates from the droplets leaving particles of dry solids. The solids can be collected in a cyclone and/or with filters. The clean effluent can be released into the air and/or the water can be condensed.

EXAMPLES

Figure 7:
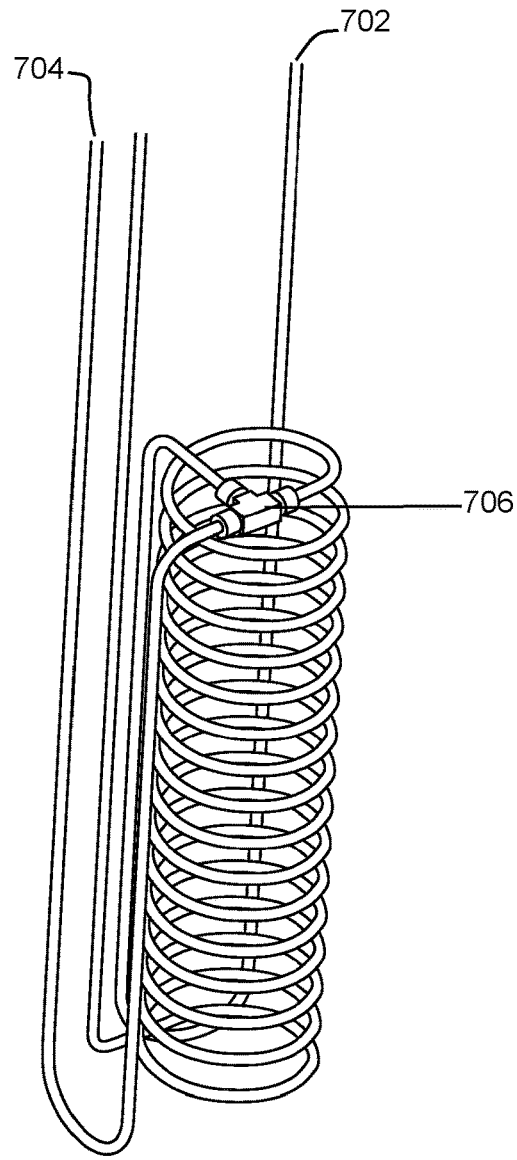
FIG. 7 illustrates the confirmation of the test reactor used in the examples.

Numerous tests have been conducted using the SCWO apparatus schematically illustrated in FIG. 7. The reactor was immersed in a hot sand bed. As the solution passed through the tubing, temperature increased to 700° C. (supercritical conditions were established at around 374° C.). The oxidant solution (comprising either $O_2$ or $H_2O_2$) in lead line 702 was mixed with the PFAS-containing stream in lead line 704 in the T-joint 706 before passing through the high temperature reactor. The cleaned effluent then passed up and out of the reactor.

Testing of the SCWO process with an aqueous solution having 1700 ppm PFOA resulted in an effluent having less than 5 ppt PFOA.

Figure 8:
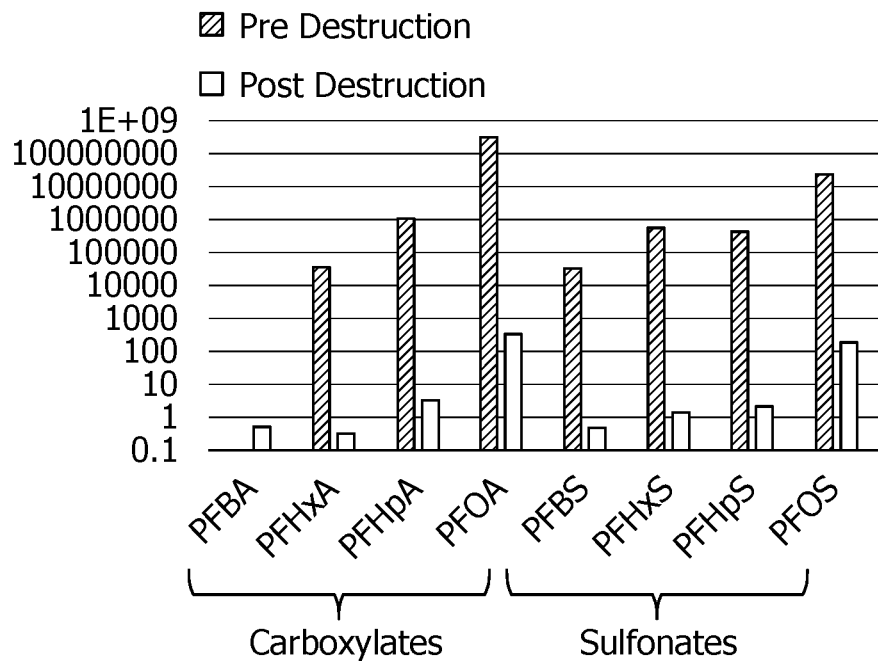
FIG. 8 shows the results of a SCWO destruction of a PFAS sample.

A test run (single pass through the SCWO reactor) was conducted with a sample prepared to simulate AFFF concentrations (386,000,000 ppt PFAS). After the SCWO destruction, 6 of the 8 PFAS analytes were reduced to below 5 ppt, with an overall destruction efficiency better than 99.999%. This is shown in FIG. 8.

Figure 9:
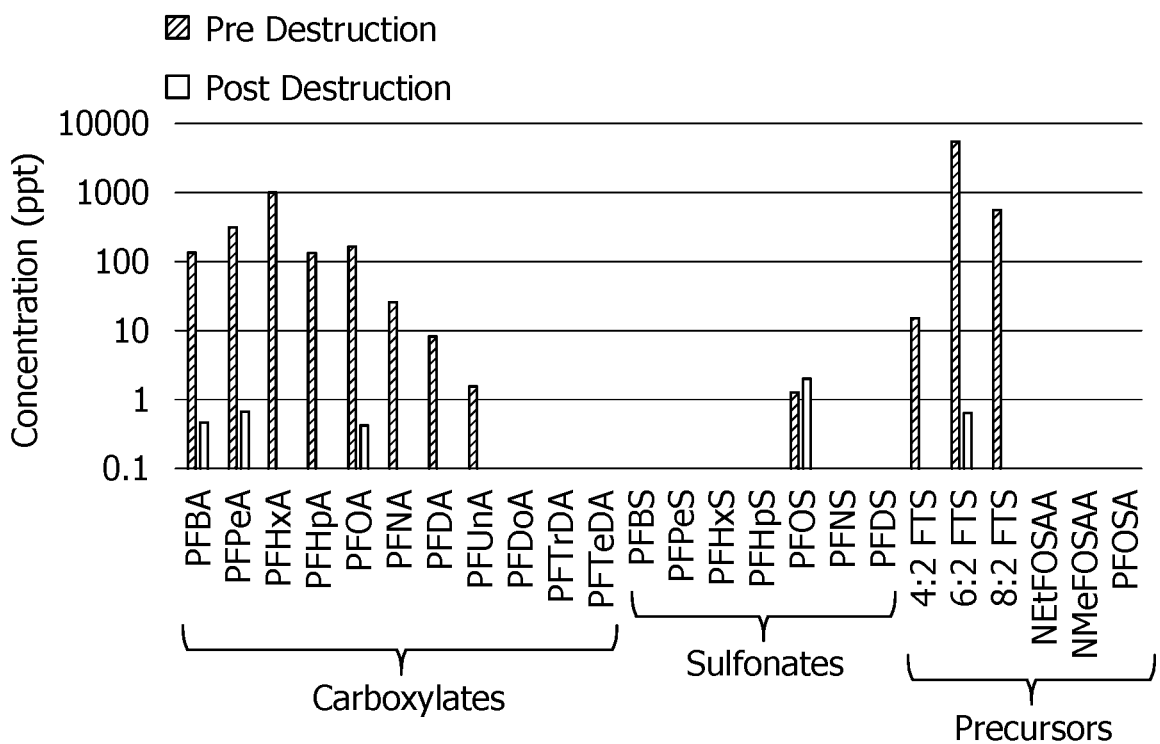
FIG. 9 shows the results of a SCWO destruction of a PFAS field sample.

A field sample comprising 8,600 ppt PFAS was passed through the reactor resulting in all 12 PFAS compounds reduced to below 5 ppt and an overall destruction of 99.95%. The before and after concentrations are shown in FIG. 9.

What is claimed:

1. A method of destroying PFAS in a PFAS-containing aqueous mixture, comprising: reacting the PFAS with an aqueous oxidant under supercritical conditions to produce an effluent, and further comprising treating the effluent from the step of reacting with an aqueous oxidant with an alkali or alkaline earth element, to convert the PFAS to a product mixture comprising carbon dioxide and an alkali or alkaline earth fluoride.

2. The method of claim 1 wherein the step of reacting the PFAS with an aqueous oxidant occurs under supercritical conditions conducted in a SCWO reactor with a residence time of 20 s or less.

3. The method of claim 2 wherein the PFAS-containing aqueous mixture comprises at least 100 ppm PFOS and the effluent comprises 1 ppm to 5 ppt PFOS.

4. The method of claim 2 wherein the PFAS-containing aqueous mixture comprises at least 100 ppt of at least one compound selected from the group consisting of PFBA, PFHxA, PFHpA, PFOA, 6:2 FTS, and 8:2 FTS and the method reduces the concentration of the at least one compound to 5 ppt or less.

5. The method of claim 2 wherein an organic fuel is added to the PFAS-containing aqueous mixture prior to the step of reacting.

6. The method claim 5 wherein the organic fuel comprises an alcohol or acetone.

7. The method of claim 5 wherein, after addition of the organic fuel, the PFAS-containing aqueous mixture comprises 0.5 to 5 wt % organic fuel.

8. The method of claim 2 wherein flow during the supercritical oxidation step is consistently downward with respect to gravity.

9. The method of claim 2 further comprising pretreating the PFAS-containing aqueous mixture to separate salts.

10. The method of claim 1 wherein the oxidant comprises hydrogen peroxide.

11. The method of claim 1 wherein the PFAS-containing aqueous mixture comprises at least 100 ppm PFOA and wherein the PFOA is destroyed by the method so that the effluent has a PFOA concentration that is reduced by a factor of at least $10^6$.

12. The method of claim 1 wherein the method is carried out in a mobile trailer.

13. A method of destroying PFAS in a PFAS-containing aqueous mixture, comprising: reacting the PFAS with an aqueous oxidant under supercritical conditions to produce an effluent, and further comprising treating the effluent from the step of reacting with an aqueous oxidant with an alkali or alkaline earth element, to convert the PFAS to a product mixture comprising carbon dioxide and an alkali or alkaline earth fluoride; and, prior to the step of reacting the PFAS with an aqueous oxidant, super-saturating the PFAS-containing aqueous mixture with air to form a supersaturated PFAS-containing aqueous mixture and passing the supersaturated PFAS-containing aqueous mixture into a tank and reducing pressure in the tank such that bubbles are generated in the aqueous mixture to create a foamed mixture.

14. The method of claim 13 wherein the step of treating the effluent with an alkali or alkaline earth element comprises treating the effluent from the step of reacting with an aqueous oxidant with NaOH, LiOH, or KOH.

15. The method of claim 14 wherein the PFAS-containing aqueous mixture comprises at least 100 ppm PFOA and the effluent comprises 1 ppm to 5 ppt PFOA.

16. The method of claim 13 wherein the PFAS-containing aqueous mixture is obtained from the foamed mixture.

17. A method of removing salt from a PFAS-containing aqueous mixture, comprising: spraying the PFAS-containing aqueous mixture through a nozzle into an expansion vessel in which the PFAS-containing aqueous mixture is vaporized leaving a salt-containing stalactite on an exterior surface of the nozzle.

18. The method of claim 17 further comprising heating the PFAS-containing aqueous mixture in a heat exchanger prior to the step of spraying.

19. The method of claim 17 wherein the nozzle is jacketed and heated with a recycle stream comprising an effluent from a SCWO reactor.

20. The method of claim 17 wherein the PFAS-containing aqueous mixture is passed through a conduit to the nozzle and wherein pressure in the expansion vessel is at least five times less than in the conduit.

21. The method of claim 17 wherein the nozzle has an orifice having a diameter of 1.5 mm or less.

22. The method of claim 17 wherein the vaporized PFAS-containing aqueous mixture is condensed and passed into a SCWO reactor where PFAS in the PFAS-containing aqueous mixture is destroyed.

* * * * *